États-Unis Patent Office 3,009,919
Patented Nov. 21, 1961

3,009,919
PHTHALOCYANINE VAT DYES
John Taras, Alpha, and David I. Randall, New Vernon, N.J., assignors to General Aniline & Film Corporation, New York, N.Y., a corporation of Delaware
No Drawing. Filed Aug. 30, 1956, Ser. No. 606,951
2 Claims. (Cl. 260—314.5)

This invention relates to phthalocyanine vat dyes and relates more particularly to the preparation of cobalt phthalocyanine vat dyes.

Metallized and metal-free phthalocyanine coloring matters, which are distinguished by their strong, clear shades and excellent fastness properties, have been used for the most part for pigmenting and as dyestuffs for lake-making. As early as 1929 (British Patent 322,196) it was shown that certain phthalocyanine compounds have the property of being vatted. For example, it was stated that both the unsulfonated and sulfonated copper, nickel and iron phthalocyanines could be vatted. These products never were used as vat dyes chiefly because of their poor affinity to the fiber, the dull shades they produced, and their lack of light fastness. The first mention of the use of cobalt phthalocyanine as a vat dye is found in the work of Bienert (P.B. No. 70,399, Frame 11206 (1948)). Practically speaking, however, cobalt phthalocyanine per se has poor solubility in the vat, producing as a result weak blue dyeings.

It is an important object of this invention to provide derivatives of cobalt phthalocyanine whose solubility in the vat is superior to that of cobalt phthalocyanine alone. Another object of this invention is the provision of derivatives of cobalt phthalocyanine which are useful for dyeing textile fibers from the vat in strong, blue to greenish-blue shades of excellent light fastness properties. Other objects and advantages of this invention will appear from the following description and claims.

In accordance with the instant invention, the solubility of a cobalt phthalocyanine in the vat and consequently the strength of dyeing obtained therewith is immensely improved by reacting cobalt phthalocyanine with aluminum chloride and a sulfur compound containing one or more of each of the elements sulfur, oxygen, chloride and bromine.

More specifically, the vat dyes of this invention are formed inter alia by reacting cobalt phthalocyanine with (1) aluminum chloride plus sulfur dioxide, (2) aluminum chloride plus thionyl chloride, (3) either of the systems (1) and (2) plus a halogenating agent such as, for example, sulfuryl chloride or chlorine, and (4) either of the systems (1) and (2) plus paraformaldehyde. The dyeings obtained from the products of these reactions have been found to be surprisingly superior to the dyeings resulting from the use of unreacted cobalt phthalocyanine.

The foregoing reactions may be carried out at temperatures ranging from about 50 to 180° C. depending upon the reaction time and the color of the vat dye desired. Thus, to obtain a bright blue vat dyestuff the reaction is preferably carried out between 50° and 100° C. in six parts of aluminum chloride to one part of cobalt phthalocyanine. When the reaction is performed at the lower temperature (50° C.) a longer reaction period is required than when the higher temperature (100° C.) is chosen. The reaction proceeds equally well when the amount of aluminum chloride is raised to more than six parts although no advantage results from such an increase. Decreasing the amount of aluminum chloride below six parts involves a reaction which becomes too thick to stir. The amount of sulfur compound can be varied from 3 to 8 parts per part of cobalt phthalocyanine.

To obtain a greenish-blue vat dyestuff the same conditions are selected as those described in the preparation of the blue dyestuff but the reaction is conducted between 100 to 180° C. In general, the higher the temperature the greener the resulting vat dye when the time factor is held constant. Also at any given temperature between the range 100 to 180° C. the longer the duration of the reaction up to a certain time the greener the product. The formation of these greenish-blue vat dyes is accelerated by the addition to the (1) aluminum chloride-$SO_2$ melts and (2) aluminum chloride-$SOCl_2$ melts controlled amounts of a halogenating agent such as chlorine or sulfuryl chloride. These greenish-blue dyes are characterized by an unexpected improvement in their chlorine fastness when compared to bright blue cobalt phthalocyanine vat dyes.

While the mechanism of the reaction is not clearly understood, it is obvious that the cobalt phthalocyanine reacted in accordance with this invention assists the reacted cobalt phthalocyanine as well as any unreacted cobalt phthalocyanine included therewith to dye from the vat. It has been found that even small amounts of the cobalt phthalocyanine derivatives of this invention will convert larger amounts of unreacted cobalt phthalocyanine with poor vatting properties into a state in which they exhibit excellent vatting properties. Accordingly, it will be understood that the proportion of unreacted cobalt phthalocyanine to reacted cobalt phthalocyanines in such mixtures may be adjusted as desired by controlling the proportions of reactants or by mixing predetermined amounts of unreacted cobalt phthalocyanine with the cobalt phthalocyanine derivatives produced in accordance with the process of this invention.

The cobalt phthalocyanine derivatives of this invention may be vatted in known manner with caustic and hydrosulfite, and the vats employed for dyeing textile fibers in strong, bright blue shades of excellent light fastness. Subsequent oxidation may be achieved in known manner by exposing the dyed fiber to the air or by dipping it in an oxidizing bath, for instance a solution of sodium perborate or aqueous acetic acid solutions of sodium dichromate. The dyestuff mixtures of this invention are capable of being vatted even in a weakly alkaline medium for instance in the presence of ammonia, and therefore may also be employed for dyeing animal fibers from the vat in addition to fibers having a basis of synthetic polymeric materials.

The following examples, in which parts are by weight unless otherwise indicated, are illustrative of the instant invention and are not to be regarded as limitative. Examples I through XVI illustrate the preparation of dyestuff mixtures in accordance with this invention, and Examples XVII through XIX illustrate representative dyeing procedures employing such dyestuff mixtures.

*Example I*

A flask is charged with 130 parts aluminum chloride. A stream of sulfur dioxide is passed into the aluminum chloride until the mass becomes liquid at a temperature of 55 to 60° C. 10 parts cobalt phthalocyanine are added and the temperature of the reaction is raised to 70° C. The reaction is maintained at 70 to 72° C. for one hour. The melt is drowned in 2000 parts water containing 200 parts concentrated hydrochloric acid.

The product is filtered, washed neutral and free of inorganic salts and the filter cake made into a homogeneous paste. The product dyes cotton from a greenish-yellow vat full, clear blue shade which is distinguished by excellent fastness to light.

The product contains 4.42% chlorine and 2.13% sulphur.

Example II

A flask is charged with 130 parts aluminum chloride. Sulfur dioxide gas is passed into the flask until the melt becomes liquid. This takes place at 55–60° C. 10 parts cobalt phthalocyanine are added and the temperature of the reaction is raised to 100° C. and maintained at 100° C. for one hour. The melt is drowned in 2000 parts water containing 200 parts concentrated hydrochloric acid.

The product is filtered, washed neutral and free of inorganic salts and the filter cake made into a homogeneous paste. The product dyes cotton from a greenish-yellow vat full, clear blue shades having good light fastness.

Example III 5 parts of the product obtained in Example II is dissolved in 140 parts of 100% sulfuric acid. There is now added 4 parts paraformaldehyde. The solution is heated to 90 to 92° C. in a ½ hour and the reaction is maintained at 90 to 92° C. for one hour. The solution is drowned in 1500 parts water. The product is filtered, washed neutral and made into a homogeneous paste.

The product dyes cotton from a greenish-yellow vat full, clear blue shades somewhat weaker but greener than the product described in Example II.

Example IV

The procedure is the same as Example I but the reaction is maintained at 50 to 55° C. for one hour only. The reaction mixture is worked up as in Example I.

The product dyes cotton from the vat a strong, bright blue shade whose light fastness is excellent.

Example V

A flask is charged with 130 parts aluminum chloride. Sulfur dioxide gas is passed into the flask until the melt becomes liquid. This occurs at 55 to 60° C. 13 parts cobalt phthalocyanine are added and the temperature of the reaction is raised to 80 to 85° C. and held at 80 to 85° C. for one hour.

The reaction mass is worked up as in Example I.

The product is similar to that obtained in Example I.

Example VI

A flask is charged with 65 parts aluminum chloride and 50 parts thionyl chloride. The temperature is adjusted to 50° C. and 10 parts cobalt phthalocyanine is added. The reaction mass is heated to 90 to 92° C. in a ¼ hour and maintained at 90 to 92° C. for one hour. The reaction mass is drowned in 2000 parts water, 200 parts hydrochloric acid solution. The product is filtered, washed neutral and free of inorganic salts.

The product dyes from the vat a strong greenish-blue shade possessing excellent light fastness. It contains 18.0% chlorine and 5.90% sulfur.

Example VII

The procedure is the same as in Example VI but the reaction mass is heated to 70° C. in ¼ hour and held at 70 to 72° C. for one hour.

The product contains 10.85% chlorine and 4.16% sulfur. It dyes from the vat a strong greenish-blue shade somewhat less green than the product described in Example VI.

Example VIII

A flask is charged with 130 parts aluminum chloride, 100 parts thionyl chloride and 10 parts cobalt phthalocyanine. The reaction mass is heated to 50° C. and maintained at 50° C. for three hours. The reaction mass is drowned in 3000 parts ice and 300 parts concentrated hydrochloric acid.

The product is filtered, washed neutral and free of inorganic salts. The product contains 4.1% chlorine. It dyes from the vat a blue shade of medium tinctorial strength.

Example IX 8 parts of the product obtained in Example VIII was dissolved in 125 parts monohydrate. 6 parts paraformaldehyde was added and the reaction mass was heated to 90 to 92° C. and held at 90 to 92° C. for one hour. The reaction mass was drowned in water, filtered and washed neutral.

The product dyes from a greenish-yellow vat a strong, bright blue shade of excellent light fastness.

Example X

A flask is charged with 65 parts aluminum chloride, 50 parts thionyl chloride. The temperature is adjusted to 50° C. There is added 10 parts cobalt phthalocyanine and 8 parts paraformaldehyde. The reaction mass is heated to 70° C. and the reaction mass is maintained at 70 to 72° C. for one hour. The reaction mass is drowned in water and worked up as in Example I.

The product contains 6.25% chlorine and 1.28% sulfur.

The product dyes from the vat a strong, bright blue shade possessing excellent light fastness.

Example XI

The procedure is the same as in Example X but the reaction temperature is raised to 90° C. and held at 90 to 92° C. for one hour.

After working up as in Example X, the product dyes from the vat a greenish-blue shade on cotton.

Example XII

A flask is charged with 65 parts aluminum chloride, 50 parts thionyl chloride. The temperature is adjusted at 50° C. and 10 parts cobalt phthalocyanine are added. The reaction is held at 50 to 52° C. for one hour. It is then drowned immediately and worked up as in Example I.

The product dyes from the vat a bright blue shade of medium strength.

Example XIII

A flask is charged with 65 parts aluminum chloride and 50 parts thionyl chloride. 10 parts cobalt phthalocyanine is added at 50° C. The reaction mass is heated to 120° C. and the temperaure is maintained at 120° C. for one hour. The product is isolated as in Example I.

The product contains 32.0% chlorine and 8.7% sulfur. It dyes cotton a green-blue shade from the vat of moderate tinctorial strength. It has fair chlorine fastness and good light fastness.

Example XIV

A flask is charged with 65 parts aluminum chloride, 50 parts thionyl chloride. The temperature is adjusted to 50° C. 10 parts cobalt phthalocyanine are added and the reaction mixture is heated to 120° C. 10 parts sulfuryl chloride are added and the reaction mixture is heated to 150° C. and the temperature is maintained at 150° C. for a ½ hour longer. The product is isolated as described in Example I.

It dyes cotton from the vat much greener than the product described in Example XIII. It contains 43.1% chlorine and 6.65% sulfur.

Example XV

A flask is charged with 130 parts aluminum chloride. Sulfur dioxide gas is introduced until the reaction mass becomes liquid. This occurs when the reaction mass attains a temperature of 55° C. 10 parts cobalt phthalocyanine are added. The stream of sulfur dioxide is introduced into the mass again while heating to 115 to 120° C. The reaction is maintained at 115 to 120° C. for a ½ hour. The reaction mass is drowned and worked up as described in Example I.

The product dyes from a yellow-green vat a strong, greenish-blue shade on cotton.

Example XVI

The procedure is the same as that described in Example XV. The reaction temperature however is raised to 135 to 140° C. and maintained at 135 to 140° C. for a ½ hour.

The product is vatted in caustic soda-sodium hydrosulfite. It dyes cotton a greenish-blue shade of good fastness properties. The shade is greener than that obtained in Example XV.

Example XVII 2.0 parts of a cobalt phthalocyanine paste derivative of any of the products obtained in Example I to V (corresponding to 0.2 part of the 100% dyestuff) are added to enough water to make a total of 300 parts by volume of dye solution. 6 parts by volume of concentrated caustic solution (30° Bé.) and 1.5 parts of sodium hydrosulfite are added and the dye mixture is reduced by heating at 130° F. for ten minutes. 10 parts of cotton are dyed in the usual manner at 130° F. for 45 minutes. The cotton is squeezed off and hung in the air for ten minutes to oxidize. The cotton dyeing is rinsed in cold water, treated with dilute acetic acid solution and it is rinsed with water. The dyeing is then washed at the boil with soap for twenty minutes, rinsed and dried. Full blue to greenish-blue shades are obtained.

Example XVIII

The following process describes the dyeing of wool with the cobalt phthalocyanine derivatives prepared in Examples I to V.

0.2 part of a 100% cobalt phthalocyanine derivative prepared as in this subject proposal is vatted by adding 2 parts by volume of concentrated ammonia (25%) and 0.8 part sodium hydrosulfite in a total volume of 125 parts by volume of water. The vatting is accomplished by heating at 75° C. The final volume of the vat is brought to 500 parts by volume by adding water.

10 parts of wool are dyed in this liquor by the usual technique at 51 to 52° C. for 20 minutes. After wringing out the wool, it was hung in the air for 30 minutes, rinsed with water and then treated with dilute acetic acid (5 parts by volume of glacial acetic acid per 1000 parts by volume of water), rinsed and dried.

Blue to greenish-blue dyeings of good light fastness properties are obtained.

Example XIX 2.0 parts of a cobalt phthalocyanine paste (corresponding to 0.2 part of the 100% dyestuff are added to 3.5 parts by volume of concentrated caustic solution (34° Bé.) and 1.5 parts sodium hydrosulfite and enough water to make a total volume of 30 parts of dye solution. The dye solution is heated at 110° F. for ten minutes. The volume of the dye solution is brought to 300 parts by the addition of cold water. The temperature is adjusted to 80° F. and 10 parts of cotton are dyed in the usual manner at 80° F. for 45 minutes. After 20 minutes of dyeing 10 parts of Glauber's salts are added, the dyeing is completed for the remaining 25 minutes.

The cotton is squeezed off and hung in the air for 10 minutes. The cotton dyeing is rinsed in cold water, treated with dilute acetic acid solution, it is rinsed once more with water, and it is boiled for 20 minutes with soap, rinsed and dried.

Full blue to greenish-blue shades are obtained.

It is to be understood that the foregoing detailed description is merely given by way of illustration and that many variations may be made therein without departing from the spirit of our invention.

Having described our invention, what we desire to secure by Letters Patent is:

1. In a process for preparing vat dyes of improved solubility in the vat, the improvement which comprises treating cobalt phthalocyanine with a mixture consisting essentially of aluminum chloride and sulfur dioxide, at a temperature between 50 and 180° C. until at most 8 chlorine atoms are caused to enter the phthalocyanine molecule.

2. The halogenated cobalt phthalocyanine product of claim 1 having a chlorine content of at most 33.4%.

References Cited in the file of this patent

UNITED STATES PATENTS

| | | |
|---|---|---|
| 2,164,930 | Lubs | July 4, 1939 |
| 2,201,010 | Papini | May 14, 1940 |
| 2,214,469 | Linstead et al. | Sept. 10, 1940 |
| 2,247,752 | Fox | July 11, 1941 |
| 2,276,860 | Niemann et al. | Mar. 17, 1942 |
| 2,377,685 | Fox et al. | June 5, 1945 |
| 2,613,128 | Baumann et al. | Oct. 7, 1952 |
| 2,647,126 | Pugin | July 28, 1953 |
| 2,648,672 | Muehlbauer | Aug. 11, 1953 |
| 2,756,119 | Baumann et al. | July 24, 1956 |

FOREIGN PATENTS

| | | |
|---|---|---|
| 586,340 | Great Britain | Mar. 14, 1947 |
| 688,784 | Great Britain | Mar. 11, 1953 |
| 704,231 | Great Britain | Feb. 17, 1954 |